United States Patent [19]

Tsujimoto

[11] 4,054,889

[45] Oct. 18, 1977

[54] MOTOR-DRIVEN APPARATUS FOR CAMERA

[75] Inventor: Kayoshi Tsujimoto, Osaka, Japan

[73] Assignee: Minolta Camera Kabushiki Kaisha, Osaka, Japan

[21] Appl. No.: 592,965

[22] Filed: July 3, 1975

[30] Foreign Application Priority Data

July 26, 1974 Japan .............................. 49-086262
Aug. 30, 1974 Japan .............................. 49-100306

[51] Int. Cl.² .................... G03B 17/50; G03B 1/18; G03B 9/00
[52] U.S. Cl. ................................... 354/83; 354/86; 354/173; 354/230
[58] Field of Search .................. 354/83, 86, 173, 230

[56] References Cited

U.S. PATENT DOCUMENTS

| 3,750,551 | 8/1973  | Land et al. ............... 354/83  |
| 3,754,455 | 8/1973  | Tsujimoto ............... 354/173   |
| 3,763,755 | 10/1973 | Kuramoto ............... 354/173    |
| 3,893,136 | 7/1975  | Ando et al. ............... 354/173 |
| 3,967,304 | 6/1976  | Johnson et al. ............... 354/83 |

Primary Examiner—John Gonzales
Attorney, Agent, or Firm—Wolder & Gross

[57] ABSTRACT

A motor-driven apparatus for use in a camera equipped with a shutter device which is normally maintained in a close position after the termination of an exposure and adapted to be shifted to an open position in response to the shutter release operation, comprises a motor for driving the film; a switch opened during the transportation of the film and closed upon the termination of the transportation of the film; an electric circuit for producing signals only when the shutter device is shifted from the open position to a closed position; and a semi-conductor control circuit connected in series with the switch between the motor and the cells, the semi-conductor control circuit being rendered conductive by signals from the electric circuit and rendered non-conductive when the switch is opened.

21 Claims, 9 Drawing Figures

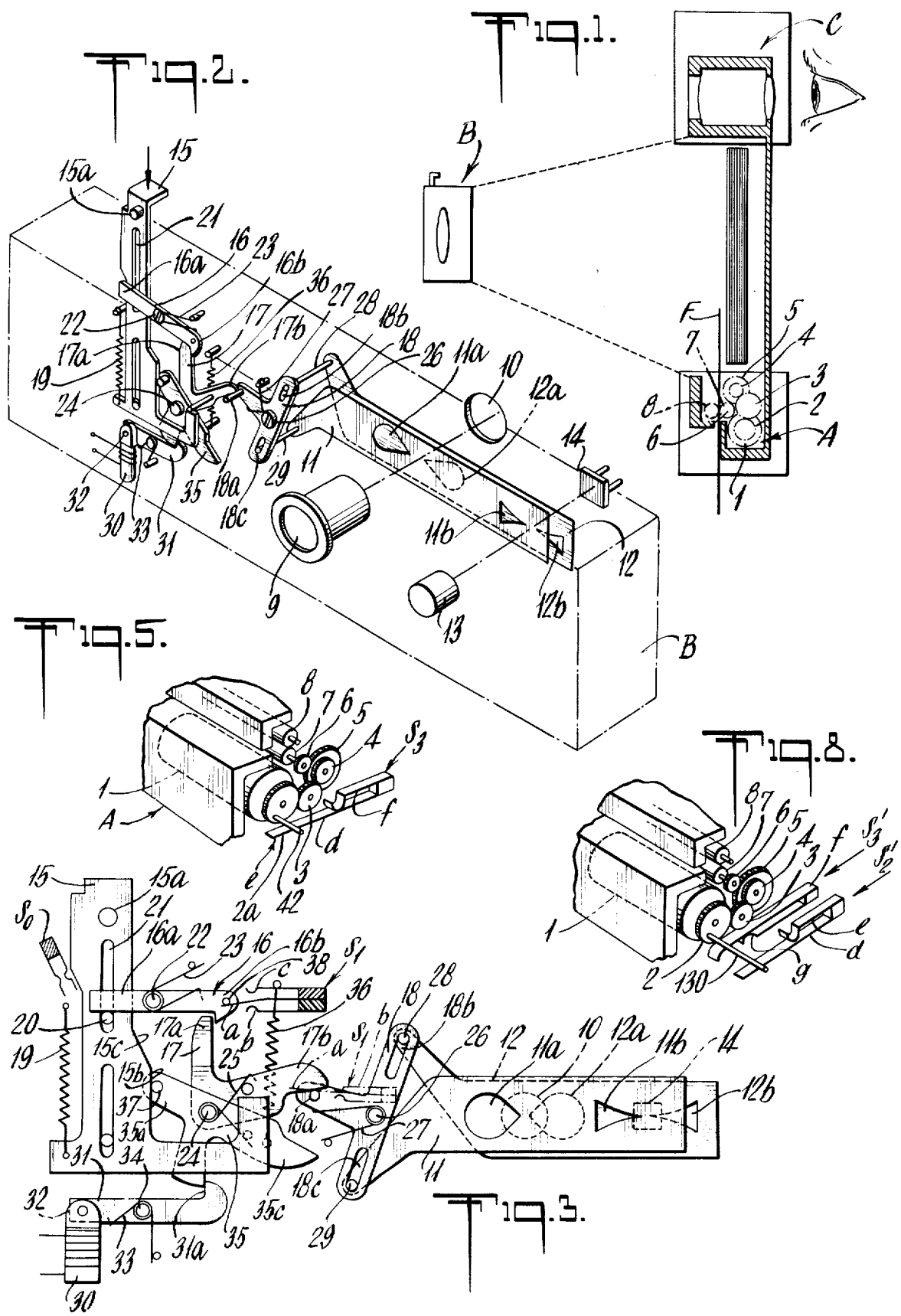

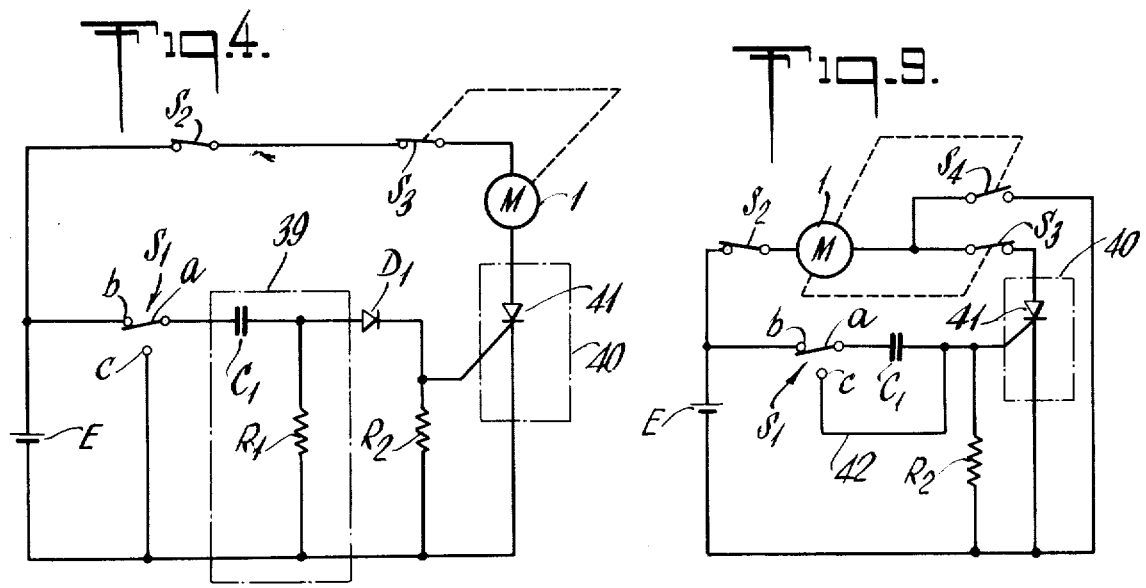
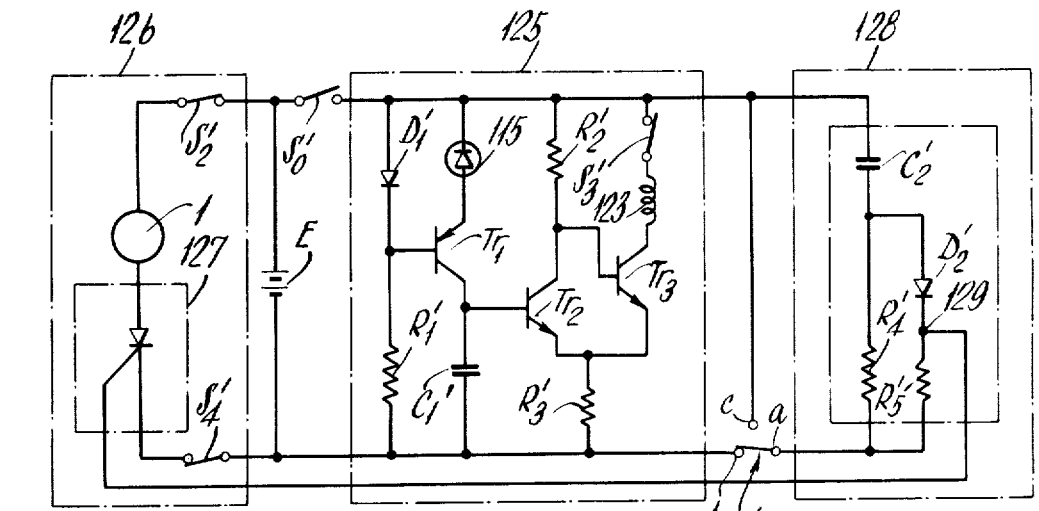
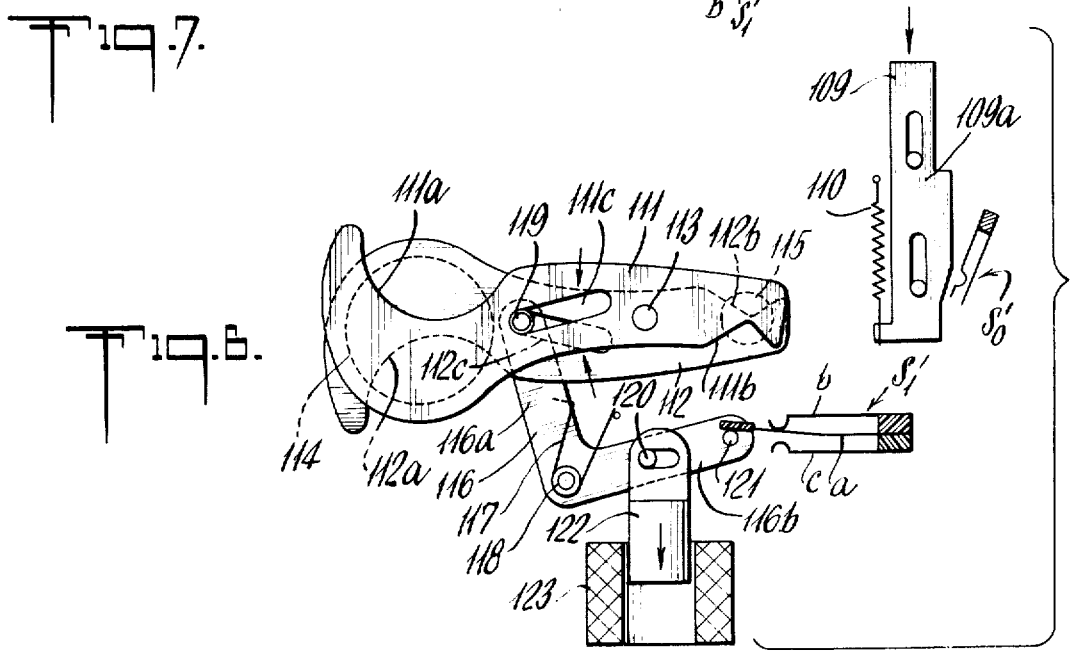

MOTOR-DRIVEN APPARATUS FOR CAMERA

BACKGROUND OF THE INVENTION

The present invention relates to a motor-driven apparatus, and more particularly, to a motor-driven apparatus for use in a camera equipped with a shutter device which is normally maintained in a close position after the termination of an exposure and opened in response to the shutter release operation.

The shutter device of the subject type finds wide use for almost all cameras, except for a single lens reflex camera which is disclosed in U.S. Pat. No. 3,750,543. If a motor-driven camera, in which the such shutter device is so constructed that a film drive motor is driven in association with the closing motion of the shutter device, the motor continues to rotate even after the termination of the film transportation. To avoid this, it is imperative to provide means for stopping the motor simultaneously with the termination of the film transportation. Thus, the motor-driven camera of the prior art includes a first switch which is opened in response to the releasing motion of the shutter device and closed in response to the closing motion thereof, and a second switch connected in series with the first switch and opened in response to the termination of the film transportation, the first and second switches being disposed between the motor and an electric power source. In this case, if the second switch is opened before the shutter device is released, then the motor will be undesirably driven, because the first switch is maintained closed at this stage, while if the second switch is opened after the shutter device has been closed, then the actuation of the motor following the termination of exposure is delayed. For these reasons, the second switch, in general, is so arranged as to be closed in response to the opening and closing motions of the shutter device. In such a case, it is necessary to correlate the film transfer mechanism and the shutter device with the second switch. This, however, results in a complicated construction of the camera.

To solve the above described drawback, a motor-driven camera is proposed in U.S. Pat. No. 3,754,455, wherein the first switch is substituted by a capacitor which is continuously charged for a period during which the shutter device is maintained closed and a semi-conductor controlling circuit rendered conductive when the voltage in the capacitor reaches a given level; while the second switch is opened and closed in association with the motion of the film transfer mechanism only. In this motor-driven camera, the capacitor is continuously charged as long as the shutter device is maintained closed, such that if the second switch is closed upon the termination of the film transportation, the semi-conductor controlling circuit is again rendered conductive, to thereby actuate the motor. Thus, a motor-driving circuit is separately provided in that camera, to the effect that the second switch is once opened upon the termination of the film transportation, and the motor is preliminarily driven for a short period of time by the motor driving circuit separately provided, at the initial stage of the shutter release operation for a subsequent exposure, so that the second switch may be re-closed due to the preliminary driving of the motor. Such a construction, however, is attended with a risk that an unexposed film may be accidentally transported due to the preliminary driving of the motor. To avoid this, it is imperative to provide a special mechanism for positively maintaining the film transfer mechanism inoperative for the duration of the preliminary driving of the motor. The provision of such a special mechanism, however, renders the construction of the camera more complicated.

A self-processing camera is now in wide public use, wherein a motor-driven apparatus is built in and an exposed film is transported to the outside of the camera body by a motor driven mechanism. As is well known, in the self-processing camera, film itself constitutes a positive print, such that there is used a special self-processing film larger in image size than the usual 35 mm film. In order to uniformly expose the entire surface of the film sheet to the light so as to produce a print of a high quality, it is obviously preferable to control the exposure amount by the aperture of the photographic lens, rather than by the use of a shutter which controls the exposure amount in the focal plane of the photographic lens. Thus, a lens shutter system is suited for a self-processing camera. Where there is used a photographic lens of short focal length, the quantity of light incident on the circumferential portion of the plane of the film sheet is lessened, as compared with that on the central portion. This is responsible for the production of a print of an uneven exposure. For this reason, a photographic lens of long focal length is better suited for the self-processing camera. On the other hand, a film transferring mechanism, generally, is disposed close to the film sheet which is subjected to exposure. Thus, in the self-processing camera, the shutter device and the film transferring mechanism are spaced apart from each other by a greater distance than those in a camera in which a 35 mm film is used, and thus a large inter-connecting mechanism is required. From the above described viewpoint, the motor-driven apparatus of the prior art in which the second switch is interconnected with the shutter device and the film transferring mechanism is not suited for a self-processing camera.

SUMMARY OF THE INVENTION

It is accordingly a primary object of the present invention to provide a camera motivating motor-driven apparatus which is simple in construction.

Another object of the present invention is to provide a camera motivating motor-driven apparatus which is simiple in construction and whose film transporting operation is highly reliable.

A further object of the present invention is to provide a camera motivating motor-driven apparatus, wherein a semi-conductor control circuit is used as a switch means for controlling the drive of a motor, thereby assuring a highly reliable film transport operation.

A still further object of the present invention is to provide a motor-driven apparatus particularly useful for a self-processing camera.

The motor-driven apparatus according to the present invention is used in a camera which is equipped with a shutter device normally maintained in a close position after the termination of the exposure and adapted to be shifted to an open position in response to the shutter release operation. The motor-driven apparatus comprises; means for producing signals only when a shutter mechanism has been shifted from an opened position to a closed position; film transferring means having a motor which is driven to transport the film; switch means operable between the open position of the shutter device and the closed position thereof; semi-conductor switch means adapted to be rendered conductive by the signal fed thereto from said signal producing means when the switch means is in the closed position, thereby actuating the motor, semi-conductor switch means being rendered non-conductive when the switch means is opened, and thereafter maintained non-conductive until the semi-conductor switch means receives a next signal from the signal producing means; and control means rendering the switch means open in the course of the transportation of the film in response to the motion of the film transferring means and causing the switch means to return to the initial closed position simultaneously with the termination of the film transportation. With the motor-driven apparatus of the present invention, the motor is actuated in response only to the operation of the semi-conductor switch means, i.e., the closing motion of the shutter device, while the motor is stopped in response only to the operation of the control means, i.e., the operation of the film transfer means. Thus, a mechanism for closing the switch in response to the motions of the shutter device and the film transferring device becomes simplified, unlike the motor-driven camera of the prior art, resulting in the simplicity in construction of the motor-driven apparatus in its entirety. Furthermore, in the motor-driven apparatus of the present invention, a signal is produced from the signal producing means only when the shutter mechanism is shifted from the open position to the closed position. Thus, even if the switch means is again closed upon the termination of the film transportation, unless the shutter release operation is effected, the motor remains inoperative, and hence there is no risk that the film is inadvertently transported, with the enhanced reliability.

The motor-driven apparatus of the present invention is particularly useful for a self-processing camera. Because a film of a large image size is used in a self-processing camera, as above set forth, such that a lens-shutter type shutter mechanism and an objective lens of long focal length are used, with the result that the film transfer means and the shutter mechanism are necessarily separated by a comparatively large distance. Furthermore, in order to cooperate the switch means with the shutter mechanism and the film-transfer means in a self-processing camera, a large interconnecting mechanism is needed. Where the motor-driven apparatus of the subject type is incorporated in a self-processing camera, at least the signal producing means is accommodated in a first housing together with an objective lens, while at least the film transfer means is accommodated in a second housing. In this case, the second housing is spaced by a large distance from the first housing.

The following two types of shutter mechanism are available as a shutter mechanism in a camera in which the motor-driven apparatus of the present invention is incorporated. One is the so called ever-setting shutter, which is cocked at the initial stage of the return motion of the shutter release member to its retracted position or at the initial stage of the manipulation of the shutter release member, and opened with the progress of the manipulation of the shutter release member. The other is an electric shutter which is equipped with shutter blades normally urged to closed position, and an electromagnet adapted to be energized in response to the shutter release operation, to thereby attract the shutter blades to an open position.

The above and other objects and features of the invention will appear more fully hereinafter from a consideration of the following description taken in connection with the accompanying drawings.

BRIEF DESCRIPTION OF THE DRAWINGS

FIG. 1 is a cross sectional veiw of a self-processing camera to which the present invention is applied, wherein as exposed film is shown as being transported to the outside of the camera body;

FIG. 2 is a perspective view of a shutter device incorporated in the portion B of the camera of FIG. 1, shown with the shutter blades in the closed position;

FIG. 3 is a front elevational view of the shutter device of FIG. 2;

FIG. 4 is a diagram of an electric circuit used in the motor-driven camera of a first embodiment, which is incorporated in the camera of FIG. 1;

FIG. 5 is a perspective view of an essential portion of the portion A of FIG. 1, showing the arrangement of a switch $S_2$ included in the electric circuit of FIG. 4;

FIG. 6 is a plan view of another shutter device which is incorporated in the portion B of the camera shown in FIG. 1;

FIG. 7 is a diagram of an electric circuit used in a motor-driven apparatus of a second embodiment, which is employed together with the shutter device of FIG. 6, the electric circuit being shown in the condition prior to the shutter release operation;

FIG. 8 is a perpective view of the portion A of the camera shown in FIG. 1, but the portion A is modified for use in the embodiment of FIG. 6; and FIG. 9 is a diagram of an electric circuit used in a further embodiment which is a modification of the first embodiment.

DESCRIPTION OF THE PREFERRED EMBODIMENTS

Referring now to FIGS. 1 to 5 which illustrate a preferred embodiment of the present invention as applied to a self-processing camera generally designated by the reference characters A, B and C are a film transport portion, a shutter portion and a finder portion, respectively, which are diagramatically shown. The shutter portion B is spaced a substantial distance from the film transport portion A for the above described reasons. The film transport portion A includes a motor 1, gears 2, 3, 4, 5 and 6 and rollers 7 and 8. When the motor 1 is driven, the rollers 7 and 8 are rotated by way of the gear train including gears 2, 3, 4, 5 and 6, thereby transporting a sheet of film F which has been subjected to exposure to the exterior of the camera body, as shown in FIG. 1.

The construction of the shutter portion B is illustrated in detail in FIGS. 2 and 3. Shown at 9 is a photographic lens, at 10 and opening provided behind the photographic lens 9, at 11 and 12 shutter blades slideable leftwardly and rightwardly, and at 13 a light measuring lens. The shutter blades 11 and 12 are provided with openings 11a and 12a, which serve as an exposure aperture, and openings 11b and 12b which serve as a diaphragm aperture for limiting the quantity of light which is incident on a light receiving element 14, respectively, which will be described later. Shown at 15 is a release plate, at 16 a lock lever, at 17 a shutter release lever, and at 18 a shutter blades actuating lever for opening and closing the shutter blades. Considering the construction and functions of these components, the release plate 15 is urged upwardly under the influence of a spring 19, and is restricted to slide downwardly under the guidance of a pin 20 engaging a slot 21, when depressed. In the course of the descending stroke of the release plate 15, a pin 15a provided on one side thereof engages one end 16a of the lock lever 16, thereby urging the latter downwardly. The lock lever 16 is rotatably supported by a shaft 22 and urged in the clockwise direction under the influence of a spring 23. Due to the spring force which urges the lock lever in the clockwise direction, the other end 16b thereof is maintained in engagement with one end 17a of the shutter release lever 17, and thus the lock lever 16 is maintained in the charged position, as shown in FIG. 2. When the end 16a of the lock lever 16 is pressed downwardly by the pin 15a, then the lock lever 16 is rotated in the counter-clockwise direction against the force of the spring 23, whereby the other end 16b is disengaged from the end 17a of the shutter release lever 17. The shutter release lever 17 is rotatably supported by a shaft 24 and urged in the clockwise direction by a spring 25. When engagement between one end 17a of the lever 17 and the other end 16b of the lock lever 16 is released, the shutter release lever 17 is rotated about the shaft 24 in the clockwise direction under the action of the spring 25, while the other end 17b of lever 17 presses downwardly a pin 18a provided on one end of the shutter blades actuating lever 18. The shutterblade actuating lever 18 has arms provided with slots 18b and 18c respectively. The lever 18 is rotatably supported by a shaft 26 and urged in the clockwise direction by a spring 27. The slots 18b and 18c slideably engage pins 28 and 29 attached on the shutter blades 11 and 12, respectively. When the pin 18a of the lever 18 is urged downwardly by the end 17b of the shutter release lever 17 as described, then the lever 18 is rotated about the shaft 26 in the counter-clockwise direction against the force of the spring 27, thereby sliding the shutter blade 11 rightwards and the shutter blade 12 leftwards, respectively.

Designated 30 is an electromagnet, which constitutes, in combination with the light receiving element 14, part of a known exposure amount controlling circuit (not shown). The electromagnet 30 is excited when a switch So is closed due to the initial part of the descending stroke of the release plate 15 and de-energized when an integrated value of photo-current from the light receiving element 14 reaches a given level. Designated 31 is another lock lever which has an armature 32 on one end, and is urged to rotate about a shaft 34 in the clockwise direction under the influence of a spring 33. The lock lever 31 is urged in the counter-clockwise direction when the armature 32 is attracted to the electromagnet 30 due to the excitation of the latter. Shown at 35 is a shutter closing lever, which is supported coaxially with the shutter release lever 17 and urged in the counter-clockwise direction by a spring 36. Unless the release plate 15 is depressed, a pin 37 provided on one arm 35a of the lever 35 is maintained in abutment with a cam face 15b formed on one longitudinal lower edge of the release plate 15, such that the rotation in the counter-clockwise direction of the shutter lever 35 by the force of the spring 36 is not allowed. When the release plate 15 is depressed, the pin 37 becomes disengaged from the cam face 15b, and the shutter closing lever 35 is thus in a condition to rotate in the counter-clockwise direction. In this respect, however, the lever 35 is not allowed to rotate in the counter-clockwise direction, because the switch So has been closed at the time of the shutter being released, and the electromagnet 30 having been excited, and a pawl 31a of the lock lever 31 is maintained in engagement with the other arm 35b of the lever 35. Thus, the shutter closing lever 35 is not allowed to rotate in the counter-clockwise direction until the other arm 35b is disengaged from the pawl 31a due to the deenergization of the electromgnet 30. In the course of the counter-clockwise rotation of the shutter closing lever 35, another arm 35c of the lever 35 pushes upwardly the pin 18a of the shutter-blade actuating lever 18. It should be noted that the spring 36 has a spring force much stronger than that of the spring 25. Thus, when the pin 18a is pushed upwardly by the arm 35c, the shutter-blade actuating lever 18 is rocked in the clockwise direction to restore to its initial condition, while the shutter release lever 17 is urged in the counter-clockwise direction to return to its retracted or home position.

A switch S1 for producing a signal for starting the motor 1, has a movable contact a and fixed contacts b and c. The movable arm or contact a is urged by a pin 38 on lever 16 to be maintained in contacting relation to the fixed contact b under the condition in which the release plate 15 remains undepressed, and by its own resiliency is urged into engagement with the fixed contact c when the release plate 15 is depressed and the lock lever 16 is rotated in the counter-clockwise direction.

Referring to FIG. 4 showing the motor drive circuit built in the self-processing camera according to the present invention, a capacitor C1 and a resistor R1 connected in series constitute a differentiation circuit. The capacitor C1 is connected in series with a potential source E when the movable contact a of the switch S1 engages the fixed contact b, while same is connected in parallel to the resitor R1 when the movable contact a is transferred to engage the fixed contact c. Designated 40 is a semi-conductor controlling circuit including, for example, a thyristor or SCR 41, which is connected in series to the potential source E and whose gate electrode is connected by way of a diode D1 and a resistor R2 respectively to both terminals of the resistor R1, the diode D1 being connected in a direction not to allow the flow of current therethrough which has been discharged from capacitor C1. It suffices that the semiconductor controlling circuit 40 is rendered conductive when the voltage impressed on the gate electrode reaches a given level, and hence the semi-conductor controlling circuit may be of a different construction dispensing with the SCR. The motor 1 is connected in series, by way of the semi-conductor controlling circuit 40 and switchs S2 and S3, across the potential source E. The switch S2 is of the type, in which it is free to be opened or closed by manipulation from the exterior of the camera body and which enables multiple exposure photographing to be described later.

The switch S3 has a movable contact e and a fixed contact f, as best seen in FIG. 5, and is adapted to be opened or closed due to the rotation of the gear 2 in the film transporting portion A. The gear 2 is so designed as to complete one cycle of rotation for the period during which the exposed sheet of Film F is transported to the exterior of the camera body. Near the final stage of rotation, a pin 42 rigid with the gear 2 retracts the movable contact e to thereby open the switch S3. At this stage, the motor 1 continues to rotate to some extent due to inertia, and hence the gear 2 will also be rotated to some extent, such that the pin 42 separates from the movable contact e, whereby switch S3 is closed again.

In operation, with the camera maintained in the condition shown in FIGS. 2 and 3, if a photographer pushes the release plate 15 downwards with his finger, them the switch So is first closed, whereby the electromagnet 30 is excited to attract the armature 32. Consequently, the lock lever 31 is rotated about the shaft 34 in the counter-clockwise direction, whereby the pawl 31a engages the arm 35b of the shutter closing lever 35.

If the release plate 15 is continuously depressed, then the pin 37 is disengaged from the cam face 15b, whereby the shutter closing lever 35 is permitted to rotate in the counter-clockwise direction if the engagement between the arm 35b and the pawl 31a of the lock lever 31 is released. On the other hand, almost simultaneously with the above described movement, the pin 15a of the release plate urges downwards the end 16a of lock lever 16, thereby rotating the lock lever 16 about the shaft 22 in the counter-clockwise direction against the force of the spring 23. Consequently, the other end 16b of the lock lever 16 becomes disengaged from the end 17a of the shutter release lever 17, whereby the shutter release lever 17 is rotated about the shaft 24 in the clockwise direction under the action of the spring 25, so that the lever end 17b presses the pin 18a downwards, thereby effecting the rotation of the shutter-blade opening and closing lever 18 about the shaft 26 in the counter-clockwise direction. As a consequence, the shutter blade 11 is slid rightwards, while the shutter blade 12 is slid leftwards, respectively, so that the openings 11a and 12a are brought into register with each other on the optical axis of the photographic lens 9 and the opening 10, thereby defining an exposure aperture. At the same time, the openings 11b and 12b are also brought into register with each other between the light measuring lens 13 and the light receiving light responsive element 14, thereby defining a light measuring diaphragm aperture of dimensions commensurate with the displacement of the shutter blades 11 and 12, i.e., dimensions of the exposure aperture formed due to the sliding motions of these shutter blades.

During the above movement, the movable contact a of the switch S1 is swung to engage the fixed contact c due to the rotation of the rock lever in the counter-clockwise direction. As a result, electric charge which has been stored in the capacitor C1 while the movable contact a has been in engagement with the fixed contact b is discharged from the capacitor C1 by way of the resistor R1, but current does not flow to the resistor R2 because of the presence of the diode D1, and hence the SCR 41 is not triggered. Thus, the motor 1 remains de-energized and stationary at this stage.

If the release plate 15 is maintained depressed even after the completion of the above described operation, then the integrated value of photo-current in the light receiving element 14 in the exposure amount controlling circuit reaches a given level after the lapse of time commensurate to the luminous intensity of the photographic object, and then the electromagnet 30 becomes de-energized. Consequently, the lock lever 31 is rotated about the shaft 34 in the clockwise direction by the spring 33, such that the pawl 31a is released from its engagement with the arm 35b of the shutter closing lever 35, whereby the shutter closing lever 35 starts rotating about the shaft 24 in the counter-clockwise direction under the action of the spring 36. In the course of the rotation of the shutter closing lever 35 in the counter-clockwise direction, the arm 35c of the shutter closing lever 35 urges upwardly the pin 18a of the shutter-blade actuating lever 18, whereby the shutter-blade actuating lever 18 is rotated in the clockwise direction, and the shutter release lever 17, whose end 17b engages the pin 18a, is rotated in the counter-clockwise direction against the force of the spring 25. Through the rotation of the shutter-blade actuating lever 18 in the clockwise direction, the pins 28 and 29 are caused to slide along the slots 18b and 18c, following the motion of the shutter-blade actuating lever 18, and the shutter blades 11 and 12 are returned to the position shown in FIGS. 2 and 3, in which their openings 11a and 12a are out of register. The shutter release lever 17 which has been rotated in the counter-clockwise direction through the rotation of the shutter closing lever 35 brings it end 17a to a position leftwards of the end 16b of the lock lever 16, and thus, the end 17a is engageable with the end 16b.

Stated otherwise, if a photographer removes his finger from the release plate 15 at this stage, then the release plate 15 is returned to its home position under the action of the spring 19. Consequently, the pin 15a of the release plate 15 is moved upwards, such that the lock lever 16 is free to rotate in the clockwise direction under the action of the spring 23, thereby engaging the end 16b with the end 17a of the shutter release lever 17. At this time, the arm 35b of the shutter closing lever 35 is urged by the cam face 15b of the release plate 15, whereby the shutter closing lever 35 is forcibly rotated in the clockwise direction against the force of the spring 36 to be returned to the position shown in FIGS. 2 and 3. The rotation in the clockwise direction of the shutter closing lever 35 does not cause the rotation of the shutter-blade actuating lever 18 in the counter-clockwise direction, because the shutter release lever 17 is maintained locked by the lock lever 16.

Due to the rotation in the clockwise direction of the lock lever 16 which results from the returning motion of the release plate 15 to its retracted or home position, the movable terminal a of the switch S1 is transferred to contact the fixed contact b. Consequently, the charging of the capacitor C1 starts, thereby allowing a current to flow through the resistor R1 as well as the resistor R2. Thus, the gate of SCR 41 is opened and the semi-conductor controlling circuit 40 is energized to start the motor 1, whereby the rollers 7 and 8 are rotated by way of the gears 2, 3, 4, 5 and 6. Thus, the sheet of film F exposed to light behind the opening 10 is transported to the outside of the camera body. Immediately before the gear 2 has completed one cycle of rotation, the pin 42 depresses the movable contact e of the switch S3 to open the switch S3, such that supply of power to the motor 1 is cut off, and yet, the motor 1 does not stop at once but continues to rotate to some extent due to its inertia. Thus, the pin 42 is diverted from the movable contact e, and thereby the switch S3 is closed. The motor 1, however, is maintained stopped until the charging of the capacitor C1 restarts in the manner described, because the semi-conductor controlling circuit 40 is maintained nonconductive at this stage.

Thus, one cycle of exposure is completed, and the camera is reset to be ready for a subsequent exposure, with the shutter mechanism maintained in the charged condition.

Where a multiple exposure photographing is effected, the switch S2 should be opened before the release plate 15 is depressed. In this case, if the charging to the capacitor C1 starts and a current flows to the resistor R2, the semi-conductor controlling circuit 40 remains non-conductive, and hence the motor 1 does not rotate, so that the sheet of film F exposed is left unshifted at the exposure position behind the opening 10. On the other hand, the shutter portion B is brought into the charged condition by releasing the release plate 15 from the depressed position to return it to its home position, irrespective of whether or not the film exposed is transported. If the release plate 15 is again depressed, then the sheet of film subjected to the exposure in the preceding cycle of exposure is again exposed to light. The multiple exposure is achieved by repeating the above described procedure.

The embodiment described above may possess the drawback that, if the release plate is inadvertently depressed prior to the termination of the feed of the exposed film, the above described operation takes place and a subsequent exposure is unexpectedly effected. Such a drawback, however, is overcome with ease by disposing a switch in the film sheet transporting path, so that the electromagnet 30 may not be excited even if the switch So is closed, so far as the switch is maintained actuated or depressed by the film sheet. With such a construction, if the release plate 15 is inadvertently depressed before the exposed film has been delivered to the outside of the camera, the electromagnet 30 remains unexcited, so that the shutter closing lever 35 is free to rotate about the shaft 24 in the counterclockwise direction under the action of the spring 36, without being locked by the lock lever 31, whereby the arm 35c abuts the pin 18a. Thereafter, the pin 15a on the release plate 15 urges the end 16a of the lock lever 16 to disengage the shutter release lever 17 from the lock lever 16. However, the shutter release lever 17 is not allowed to rotate about the shaft 24 in the clockwise direction, because the spring force 36 is stronger than the spring force 25, and hence the shutter blades 11 and 12 are not advanced or slid. Thus, an exposure opening is not effected under these conditions and the risk that the film sheet is again exposed to light during the transportation to the outside of the camera body is obviated.

The embodiment described has no limitative sense, but may be subjected to any modification or change in the construction. For example, in the embodiment described, the motor driving circuit 40 is so arranged as to provide for driving the motor 1 in association with the descending stroke of the release plate 15, and as to produce outputs for driving the motor 1 in association with the returning motion of the release plate 15. In general, it suffices if the motor driving circuit 40 can produce the outputs for driving the motor 1 after the exposure aperture has been closed. The shutter portion B in the embodiment described may be changed and modified in various manners. For example, there may be used an ever-set shutter, which is to be charged during the first descending stroke of the release plate 15 and released at the final stage of the descending stroke thereof.

In FIGS. 6 to 8 which illustrate another embodiment of the present invention 109 is a release plate which is adapted to close a switch So' by the longitudinal lower edge 109a thereof, when depressed against the force of a spring 110. Designated 111 and 112 are shutter blades, which are provided with curved portions 111a and 111b, 112a and 112b, and slots 111c and 112c, respectively. As seen in FIG. 6, the shutter blades are shown in closed position, wherein one shutter blade is located atop another, as viewed in a plan view, and hence, the exposure light path remains closed. The shutter blades 111 and 112 are rotatable about a shaft 113, and when the shutter blade 111 is rotated in the counter-clockwise direction and the shutter blade 112 is rotated in the clockwise direction, then the curved portions 111a and 112a of respective shutter blades delineate an exposure aperture in front of a photographic lens 114, while the curved portions 111b and 112b thereof delineate a light measuring diaphragm aperture in front of a light receiving element 115.

Shown at 116 is a lever for rotating the shutter blades 111 and 112 so as to open or close same and which biasses to rotate about a shaft 118 in the counter-clockwise direction by a spring 117. The shutter blade actuating lever 116 has one arm 116a supporting a pin 119 and the other arm 116b supporting pins 120 and 121. The pin 119 slideably engages the slots 111c and 112c of respective shutter blades 111 and 112, while the pin 120 slideably engages a slot 122a in a plunger 122. Designated 123 is a solenoid, which constitutes an exposure amount controlling circuit of suitable well known construction with the light receiving element 115, etc. and which is adapted to be excited when the switch So' is closed due to the downward motion of the release plate 109 and to be de-energized when the integrated value of photocurrent in the light receiving element 115 reaches a given level. When the solenoid 123 is excited, the plunger 122 is attracted and pulled downwardly whereby one extremity of the slot 122a engages the pin 120 on the arm 116b of the lever 116, thereby rotating the shutter actuating lever 116 in the clockwise direction against the force of a spring 117. Due to rotation in the clockwise direction of the lever 116, the pin 119 is shifted rightwards, as viewed in FIG. 6, along the slots 111c and 112c to rotate the shutter blade 111 in the counter-clockwise direction and the shutter blade 112 in the clockwise direction, respectively. When the solenoid 123 is deenergized, the shutter actuating lever 116 is rotated in the counter-clockwise direction under the action of the spring 117, whereby the shutter blades 111 and 112 and the plunger 122 are all returned to the position shown in FIG. 6. The pin 121 on the lever 116 is an insulating pin, which is adapted to press a movable contact a of a change over switch S1' so as to transfer the movable contact a to either of fixed contacts b and c of the switch S1'. When the shutter opening and closing lever 116 is rotated in the counter-clockwise direction as shown in FIG. 6, the movable contact a of the switch S1' is urged by the pin 121 to engage the fixed contact b, and when the shutter actuating lever 116 is rotated in the clockwise direction and the pin 121 is shifted downwards, the movable contact a is swung to engage the fixed contact c due to its own resiliency or restoring force.

Referring to FIG. 7 which shows an electric circuit incorporated in the embodiment last described, the electric circuit includes an exposure amount control circuit 125, a motor driving circuit 126, and an electrical discharge circuit 128 for triggering a semi-conductor control circuit 127 included in the motor drive circuit. The exposure amount control circuit 125 consists of the light receiving element 115, a transistor Tr1 for amplifying the photo-current obtained from the light receiving element, a capacitor C1' in which the output from the transistor Tr1 is charged, and a Schmidt circuit consisting of transistors Tr2 and Tr3. In this circuit, a photoelectromotive force element such as SBC is used as the light receiving element 115. Connected to the base of transistor Tr1 are a resistor R1' for impressing voltage thereon, and a diode D1' for bringing to zero a voltage being impressed across both terminals of the light receiving element 115. The transistor Tr2 has the base connected to the collector of transistor Tr1 and is rendered conductive when the voltage across the terminals of the capacitor C1' reaches a given level, thereby cutting off a current to the transistor Tr3. The transistor Tr3 has the collector connected by way of the solenoid 123 and switch S3' to the switch So' which in turn is connected to the anode terminal of a potential source E. The transistor Tr3 is adapted to be rendered conductive the moment the switch So' is closed due to the descending motion of the release plate 109 for a period during which the switch S3' is maintained closed, thereby rendering the solenoid 123 excited. Resistors R2' and R3' are fixed resistors, which are used for stabilizing the actuation of the Schmidt circuit consisting of transistors Tr2 and Tr3.

The motor drive circuit 126 includes the motor 1, a semi-conductor controlling circuit 127 consisting of an SCR connected in series with the motor, and switches S2' and S4'. The switches S2' and S4' will be described later. The semi-conductor control circuit 127 is rendered conductive when a trigger voltage is impressed on the gate terminal thereof by the discharging circuit 128 for the time during which these switches are maintained closed, whereby current is supplied from the potential source E to the motor 1, thereby starting the motor 1. In the present embodiment, the semi-conductor control circuit 127 consists of a single SCR, but may be substituted by an electric circuit including a transistor in combination, so as to be rendered conductive when a voltage impressed on the gate terminal reaches a given level.

The discharge circuit 128 includes a capacitor C2', a diode D2' connected to the cathode terminal of the capacitor C2' and resistors R4' and R5'. The diode D2' is connected in series with the resistor R5' in a direction not to allow the flow of current thereto upon the discharging the capacitor C2'. The resistor R4' is connected in parallel with the diode D2' and the resistor R5'. The movable contact a of the change-over switch S1' is connected to the resistors R4' and R5', while the fixed contact b thereof is connected to the cathode terminal of the potential source E, and the fixed contact c is connected to the anode terminal of the capacitor C2' and the switch So'. Thus, the capacitor C2' is charged by way of the resistor R4', diode D2' and resistor R5' simultaneously when the solenoid 123 becomes deenergized, and the movable contact a of the switch S1' is turned to contact the fixed contact b for the time during which the switch So' is closed, while the capacitor C2' discharges only by way of the resistor R4' when the movable contact a of the switch S1' is transferred to engage the fixed contact c. When an electric charge is applied to the capacitor C2', the potential at the junction point 129 between the resistor R5' and the diode D2' is raised, and consequently, the semi-conductor controlling circuit 127 is energized, since the gate terminal of the circuit 127 is connected to the junction point 129.

FIG. 8 illustrates in detail the film transporting portion A shown in FIG. 1, which is modified for the present embodiment. The gear 2 is directly connected to the motor 1 and completes one cycle of rotation during one cycle of rotation of the motor 1. The gear 2 has an insulating pin 130 fixed thereto. The switches S2' and S3' are disposed, with their movable contacts d and f located within a moving locus of the insulating pin 130.

In detail, the switch S2' is so designed that the movable contact d be urged by the insulating pin 30 to be separated from the fixed contact e when the motor 1 effects substantially one cycle of rotation, immediately before the exposed film sheet has been completely delivered to the outside of the camera body. Thus, supply of power to the motor 1 from the potential source E is interrupted, but the motor 1 continues to rotate for a while due to its inertia, so that the exposed film sheet is completely delivered to the outside of the camera body, and then the motor assumes its start position of rotation. At this time, the switch S2' is again closed. The switch S3' is so arranged that the movable contact f is maintained out of contact with the fixed contact g except when the motor 1 assumes a start position of rotation. The switch S3' serves to prevent the exposed film sheet under transportation from being reexposed to light even if the release plate 109 is inadvertently depressed during the transportation of the exposed film sheet to the outside of the camera body. The switch S4' although not shown in FIG. 8, is used in the multiple exposure photographing and is freely operable from the exterior of the camera body.

In operation of the last described embodiment, starting with the camera in the condition shown in FIGS. 7 and 8 in which a preceding cycle of exposure has been terminated and the film sheet thus exposed has been completely delivered to the outside of the camera body, the switch So' is maintained opened, the switches S2' and S3' are maintained closed, and the switch S1' has its movable contact a in engagement with the fixed contact b, while the shutter blades 111 and 112 are maintained in closed positions. In this case, the multiple exposure is not effected, and hence the switch S4' is maintained closed.

With the camera maintained in the condition described, if the release plate 109 is depressed, then the switch So' is first closed, thereby rendering the transistors Tr1 and Tr3 conductive. Consequently, the solenoid 123 is excited to attract the plunger 122 thereto, i.e., downwardly as viewed in FIG. 6 whereby the shutter actuating lever 116 starts rotating about the shaft 118 in the clockwise direction against the force of the spring 117, thereby rotating the shutter blade 111 in the counter-clockwise direction and the shutter blade 112 in the clockwise direction, respectively, and at the same time, allowing the movable contact a of the switch S1' to contact the fixed contact c. Thus, the exposure aperture is formed in front of the photographic lens 114 by a combination of the curved portions 111a and 112a, and the light measuring diaphragm aperture is formed in front of the light receiving element 115 by a combination of the curved portions 111b and 112b, respectively, while the capacitor C2' starts discharging. Yet, a current does not flow through the resistor R5' because of the presence of the diode D2', and hence the semi-conductor control circuit 127 remains non-conductive.

As a result of the formation of the light measuring diaphragm aperture, commensurate to the dimensions of the aperture, photo-current flows in the light receiving element 115, and the photo-current is amplified through the transistor Tr1 which has been rendered conductive, and charges the capacitor C1'. When the voltage across both terminals of the capacitor C1' reaches a given level, a current is fed to the transistor Tr2 to render same conductive, while current to the transistor Tr3 is interrupted to thereby render the same nonconductive. As a result, the solenoid 123 is de-energized, to lose its attractive force and release the plunger, such that the shutter actuating lever 116 is rotated in the counter-clockwise direction by the action of the spring 117 to be returned to the position shown in FIG. 6. Thus, the shutter blades 111 and 112 whose motion is governed by the pin 119 are returned to the closed condition shown in FIG. 6, thereby terminating the exposure of the film sheet to light. On the other hand, the movable contact $a$ of the switch S1' is urged by the pin 121 into engagement with the fixed contact $b$.

Due to the connection of the movable contact $a$ of the switch S1' to the fixed contact $b$, a current is allowed to flow through the resistor R4', diode D2' and the resistor R5', and thus the capacitor C2' is charged. Consequently, the potential at the junction point 129 between the diode D2' and the resistor R5' is raised to open the gate terminal of the semi-conductor control circuit 127, thereby energizing the semi-conductor control circuit. Simultaneously with the energization of the semi-conductor control circuit, the motor 1 starts rotating, and the film sheet F thus exposed due to the afore described motion of the shutter blades 111 and 112 is transported to the outside of the camera body, by means of the gears 2, 3, 4, 5, 6 and the rollers 7 and 8. Then, the insulating pin 130 on the gear 2 separates from the movable contact $f$ of the switch S3', thereby causing the switch S3' to open. Immediately before the film sheet F is delivered to the outside of the camera body, i.e., immediately before the motor 1 and the gear 2 complete one cycle of rotation, the insulating pin 130 again depresses the movable contact $f$ of the switch S3' to connect it to the fixed contact $g$, and at the same time, the insulating pin 130 depresses the movable contact $d$ of the switch S2' to open the switch S2'. Since the switch S2' is rendered open, the current to the motor 1 is cut off. However, the motor 1 continues to rotate to some extent due to its inertia and assumes the start position of rotation. By this time, the exposed film sheet F has been completely delivered to the outside of the camera body. Through the rotation of the motor 1 due to inertia, the insulating pin 130 on the gear 2 is slightly rotated, so that the movable contact $d$ of the switch S2' engages the fixed contact $e$, thereby closing the switch S2'. Even if the switch S2' is closed, the semi-conductor control circuit 127 remains de-energized and the motor 1 does not rotate at this stage, because the charging of the capacitor C2' has been terminated. At this stage, the switch S3' is maintained closed.

Thus, one cycle of exposure is completed. In the embodiment last described, in the event that the release plate 109 is inadvertently depressed during the transportation of the film exposed, there is no risk that the film sheet F being transported will be re-exposed to light. This is because the switch S3' is usually maintained open during the transportation of the exposed film, and hence the transistor Tr3 remains non-conductive even if the switch So' is closed.

In this embodiment, the multiple exposure photographing is permitted by opening the switch S4' before the release plate 109 is pushed downwards. In detail, if the switch S4' is rendered open beforehand, even when the charging to the capacitor C2' starts and the trigger voltage is impressed on the gate terminal of the semi-conductor controlling circuit 127, the circuit 127 remains de-energized, and hence the motor 1 is not driven. However, the solenoid 123 is excited and de-energized in the same manner as described in the foregoing, such that the film sheet subjected to exposure in a preceding cycle of exposure is again exposed to light. Thereafter, if the release plate 109 is depressed once again, two times, or three times, then the film sheet thus exposed is subject to exposure two times, three times or any desired number of times.

As set forth in the preamble, the present invention is particularly effective for use with a camera, in which the shutter device and the film transporting device are not interconnected to each other. In the aspect that the present invention easily enables the second switch to interconnect with a motor in a motor driven camera of the prior art, the present invention is useful for a motor driven camera of the self-cocking type.

In FIG. 9 there is shown a diagram of an electric circuit used in a further embodiment of the present invention, wherein the components common to those in the preceding first embodiment are designated by the same reference numerals. An important feature of the present embodiment resides in that the transportation of the film is terminated without resorting to the inertia of the motor M. To this end, a switch S3 and a semi-conductor control circuit 40 are connected in series, the switch S3 being opened immediately before the transportation of the film F is terminated, and a switch S4 is connected in parallel with the series connected switch S3 and semi-conductor controlling circuit 40, the switch S4 being opened simultaneously with the termination of the film transportation. The capacitor C1 and the resistor R2 constitute a differentiation circuit, as in the embodiment of FIG. 4. In this embodiment, the resistor R1 in FIG. 4 is omitted, such that the electric charge which has been applied to the capacitor C1 is discharged via a lead wire 42 when the movable contact $a$ of the switch S1 is transferred to the fixed contact $c$. In the present embodiment the switch S1 is disposed in facing relations to the shutter opening and closing lever 18, as shown by a phantom line in FIG. 3, rather than disposed in a position shown by a solid line in FIG. 3. Thus, the switch S1 is transferred between the fixed contacts $b$ and $c$ by the pin 18a provided on the shutter opening and closing lever 18, as shown by a phantom line in the drawing, in a manner that the movable contact $a$ is engaged with the fixed contact $b$ when the shutter blades 11 and 12 are in the closed position, shown in FIG. 3, while the movable contact $a$ is engaged with the fixed contact $c$ when the shutter blades 11 and 12 are shifted to the open position.

In operation, if the shutter release plate 15 is depressed, then the switch So is closed to excite the electromagnet 30, thereby shifting the shutter blades 11 and 12 to the open position, whereby the movable contact $a$ of the switch S1 engages the fixed contact $c$, thereby allowing the capacitor C1 to discharge. After the lapse of a given period of time, the electromagnet 30 is de-energized, and the shutter opening and closing lever 18 is rotated about the shaft 26 in the clockwise direction. Consequently, the shutter blades 11 and 12 are returned to the closed position shown in FIG. 3, while the movable contact $a$ of the switch S1 is urged by the pin 18a to engage to the fixed contact $b$. Thus, current is allowed to flow via the resistor R2 to the capacitor C1, which is accordingly charged, whereby the potential on the both terminals of the resistor R2 is raised, thereby rendering the semi-conductor control circuit 40 conductive. Consequently, power is fed via the semi-conductor control circuit 40 and the switches S2 and S3 to the motor M, whereby the motor M is driven to transport the film F to the outside of the camera body. Immediately before the film F is completely delivered to the outside of the camera body, the switch S3 is opened by the pin 30 shown in FIG. 5, to thereby render the semiconductor controlling circuit 40 non-conductive. At this stage, the switch S4 has been closed due to the action of the pin 30, such that the motor M continues to rotate. Simultaneously, when the film F has been completely delivered to the outside of the camera body, the switch S4 is urged by the pin 30 to open, whereby supply of power to the motor M is interrupted, and thus the motor M is stopped. At this time, the switch S3 is again closed, but the supply of current to the motor M is maintained interrupted, because the semi-conductor controlling circuit 40 remains non-conductive until current to be charged to the capacitor C1 is allowed to flow to the resistor R2. In case the shutter release plate 15 is returned to its home position, the components operatively associated with the shutter release plate are operated in the like manner as in the embodiment of FIG. 4.

While there have been described and illustrated preferred embodiments of the present invention, it is apparent that numerous alterations, omissions and additions may be made without departing from the spirit thereof.

I claim:

1. A motor-driven apparatus for a film exposing camera including a body, a manual-release member, an objective lens, a shutter device normally biased to be closed and opened for an exposure against its normal bias in response to movement of said release member to its operative position, said motor driven apparatus comprising:
   means for transfering said film, including a motor driven for transference of said film;
   means for producing a signal only when said shutter device has been transferred from its opened condition to its closed condition;
   first switch means operable between an open position and a closed position;
   semi-conductor switch means made conductive for driving said motor upon receipt of said signal when said first switch means is in its closed position and being made non-conductive when said first switch means is opened; and
   means responsive to said film transfering means for opening said first switch means at a moment during the transference of said film and closing said first switch means upon termination of the transference of said film.

2. A motor-driven apparatus as defined in claim 1, wherein said signal producing means includes:
   a change-over switch transferrable between a first position and a second position;
   means for transferring said change-over switch to its first position and its second position when said shutter device is in its closed condition and its opened condition respectively;
   capacitance means charged when said change-over switch is in its first position;
   means for discharging said capacitance means when said change-over switch is in its second position; and
   resistance means through which current charging said capacitance means flows, said semi-conductor switch means being connected to said resistance means and disposed to be conductive when the voltage across said resistance means reaches a given level when said first switch means is in its closed position, said voltage across said resistance means constituting said signal.

3. A motor-driven apparatus as defined in claim 2, wherein said signal producing means further includes a diode connected between said capacitance means and said resistance means for preventing current discharging from said capacitance means from flowing through said resistance means.

4. A motor-driven apparatus as defined in claim 2, wherein said semi-conductor switch means includes a semi-conductor having a pair of terminals connected to said motor and said first switch means respectively and a gate terminal connected to said resistance means.

5. A motor-driven apparatus as defined in claim 1, wherein said shutter device includes shutter blades, means for biasing said shutter blades towards their closed position, and an electromagnet energized in response to movement of said release member to its operative position, said shutter blades being held in their opened position due to the attacting force of said electromagnet upon the energization of the latter.

6. A motor-driven apparatus as defined in claim 5, wherein said camera includes means for controlling dis-energization of said electromagnet in accordance with the brightness of scene to be photographed.

7. A motor-driven apparatus as defined in claim 5, further comprising second switch means for controlling the energization of said electromagnet in accordance with the film transferrence, said second switch means being closed only upon termination of the film transferrence, and said electromagnet being energized in response to movement of said release member to its operative position when said second switch means is closed.

8. A motor-driven apparatus as defined in claim 1, further comprising second switch means for driving said motor till the termination of the transference of said film after said semi-conductor switch means is made non-conductive, said second switch means being connected in parallel with said semiconductor switch means and said first switch means, said second switch means being opened only upon termination of the film transference.

9. A motor-driven apparatus as defined in claim 1, wherein said body of said camera includes:
   a first housing accommodating said objective lens, said release member, said shutter device and said signal producing means and a second housing accommodating said transferrence means, said film and said switch means, said film having a size larger than that of 35 mm film, said objective lens having a long focal length, and said first housing being spaced apart from said second housing so that light from the scene traversing said objective lens can expose said film within said second housing at a substantially uniform light distribution over the entire surface of said film.

10. A motor-driven apparatus as defined in claim 1, further comprising a manual switch connected in series with said motor and said semi-conductor switch means, said semi-conductor switch means remaining non-operative when said manual switch is opened even if said first switch means is closed and said signal producing means produces said signal.

11. A motor-driven apparatus as defined in claim 1, wherein said shutter device includes:
   shutter blades;

means for opening said shutter blades for an exposure in response to the movement of said release member to its operative position; and means for closing said shutter after a lapse of time from the opening of said shutter blades, said shutter opening means and shutter closing means being adapted so as to be charged to store their actuating forces in response to movement of said release member.

12. A motor-driven apparatus as defined in claim 11, wherein said shutter opening means and shutter closing means is adapted to be charged to store their actuating forces in response to movement of said release member to its home position.

13. A motor-driven apparatus for a film exposing camera including a body, a manual release member, an objective lens, a shutter device charged after termination of an exposure of said film to light traversing said objective lens and released to be opened in response to movement of said release member to its operative position, said motor-driven device comprising:

means for transferring said film, including a motor-driven for transferrence of said film;

means for producing a signal in response to the charging of said shutter device;

first switch means transferrable between an open position and a closed position;

semi-conductor switch means made conductive for driving said motor upon receipt of said signal when said first switch means is in its closed position and being made non-conductive when said first switch means is opened; and means responsive to said film transferring means for opening said first switch means at a moment during the transferrence of said film and closing said first switch means upon termination of the transferrence of said film.

14. A motor-driven apparatus as defined in claim 13, wherein said shutter device includes:

shutter blades;

means for opening said shutter blades for an exposure in response to the movement of said release member to its operative position; and means for closing said shutter after a lapse of time from the opening of said shutter blades, said shutter opening means and shutter closing means being adapted so as to be charged to store their actuating forces in response to movement of said release member.

15. A motor-driven apparatus as defined in claim 14, wherein said shutter opening means and shutter closing means is adapted to be charged to store their actuating forces in response to movement of said release member to its home position.

16. A motor-driven apparatus as defined in claim 13, further comprising a manual switch connected in series to said motor and said semi-conductor switch means, said semi-conductor means being non-conductive when said manual switch is opened even if said first switch means is closed and said producing means produces said signal.

17. A self-processing camera for use with self-processing film units having a frame size larger than conventional 35 mm film, which comprises:

an objective lens having a long focal length;

a manual release member;

a shutter device normally biased to be closed and opened only for an exposure in response to movement of said release member to its operative position;

means for transfering one of said film units which has been exposed towards the outside of said camera, said film transfering means having a motor-driven for the transference of the exposed film unit;

means for producing a signal only at the movement when said shutter device has been moved from its open condition to closed condition;

semi-conductor switch means made conductive for driving said motor upon receipt of said signal;

means responsive to said film transfering means for making said semi-conductor switch means non-operative in relation with the transference of the exposed film unit;

a first housing accomodating said film transfering means, said means for making said semi-conductor switch means non-operative and said film units; and a second housing accommodating said objective lens, said release member, said shutter device and said producing means, said second housing being spaced apart from said first housing so that light from a scene to be photographed which has passed through said objective lens can expose one of said film units within said second housing at a substantially uniform light distribution over the entire surface of the film unit.

18. A motor-driven apparatus for a film exposing camera including a manual release member, and a shutter device normally biased to be closed and opened only in response to the movement of said release member to its operative position, said motor-driven apparatus comprising:

means for transfering said film, including a motor driven for transference of said film;

means for producing a signal only at the moment when said shutter device has been moved from its open position to closed position;

semi-conductor switch means made conductive for driving said motor upon receipt of said signal; and means for response to said film transfering means for making said semi-conductor switch means non-conductive to stop the driving of said motor at a moment during the transference of said film.

19. A motor-driven apparatus as defined in claim 18, wherein said means for making said semi-conductor switch means non-conductive is adapted to be actuated immediately before termination of the transference of said film, and wherein said motor is adapted to rotate till the termination of the transference of said film due to its inertia after said semi-conductor switch means is made non-conductive.

20. A motor-driven apparatus as defined in claim 19, wherein said means for making said semi-conductor switch means non-conductive includes a first switch connected in series with said semi-conductor switch means, said first switch being opened immediately before the termination of the transference of said film and closed upon the termination of the transference of said film.

21. A motor-driven apparatus as defined in claim 18, wherein said means for making said semi-conductor switch means non-conductive includes a first switch connected in series with said semi-conductor switch means, said first switch being opened during the transference of said film and closed upon the termination of the transference of said film, said motor-driven apparatus further comprising a second switch connected in parallel with said semi-conductor switch means and said first switch, said second switch being normally closed and opened only upon the termination of the transference of said film, whereby said motor is driven till the termination of the transference of said film after said semi-conductor switch means is made non-conductive and said semi-conductor switch means is made conductive for driving said motor upon receipt of said signal with the transference of said film being terminated.

* * * * *